(No Model.)

J. G. & S. A. SUTTON.
FILTER.

No. 535,308.

Patented Mar. 5, 1895.

WITNESSES:
Fred G. Dieterich
Jos. A. Ryan

INVENTORS
Joseph G. Sutton.
Smith A. Sutton.
BY Munn & Co.
ATTORNEYS.

UNITED STATES PATENT OFFICE.

JOSEPH G. SUTTON AND SMITH A. SUTTON, OF WEST NEWTON, PENNSYLVANIA.

FILTER.

SPECIFICATION forming part of Letters Patent No. 535,308, dated March 5, 1895.

Application filed April 27, 1894. Serial No. 509,190. (No model.)

*To all whom it may concern:*

Be it known that we, JOSEPH G. SUTTON and SMITH A. SUTTON, residing at West Newton, in the county of Westmoreland and State of Pennsylvania, have invented certain new and useful Improvements in Filters, of which the following is a specification.

Our invention relates more particularly to filtering means especially adapted for use in wells or cisterns, and it has primarily for its object to provide a filtering device of this character, of a simple and economical construction, and which will effectively serve for its intended purposes.

It has also for its object to provide a filter having a cleaning brush adapted to be normally held from contact with the filtering walls and which is capable of being rotated and reciprocated over such walls, to remove the accumulations which may settle thereon.

Furthermore it has for its object to provide a filtering device having a supplemental tank or water holder connected with the main filtering chamber provided with valve mechanism, adapted to be set in operation as the said filtering chamber becomes filled, whereby a back pressure effect is produced on the water within such chamber, to force it out through the porous or filtering walls and thereby serve to clean the same.

With other minor objects in view, which hereinafter will be referred to the invention consists in such peculiar combination and novel arrangement of parts, first described in detail and then particularly pointed out in the appended claims, reference being had to the accompanying drawings, in which—

Figure 1:
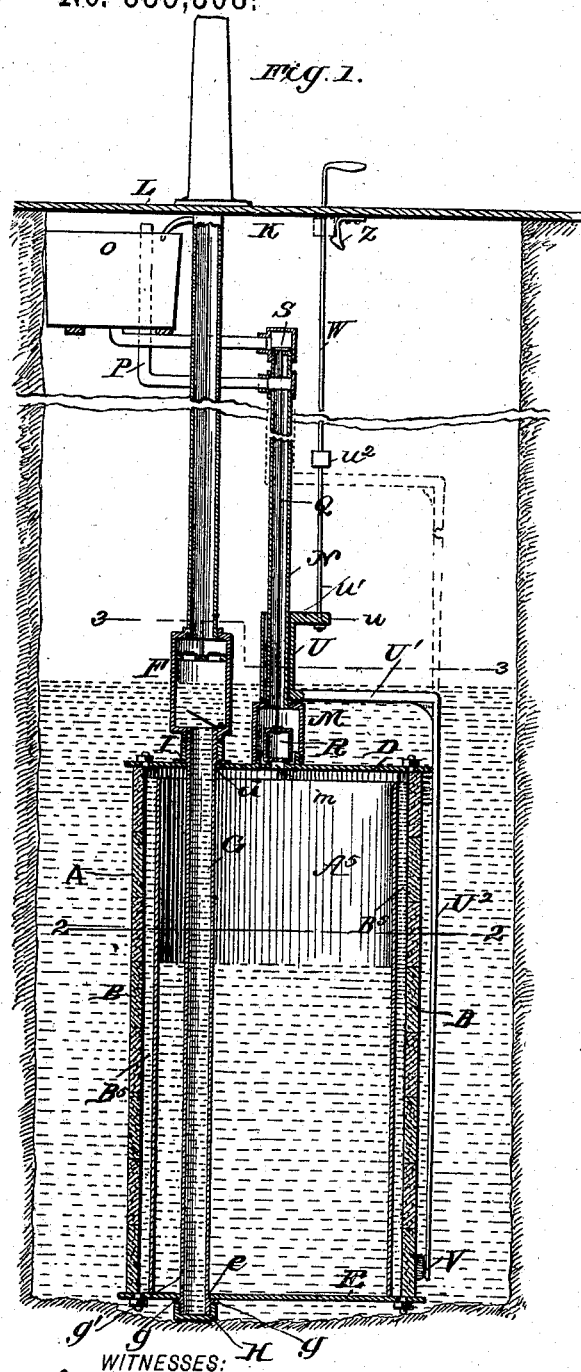
Figure 4:
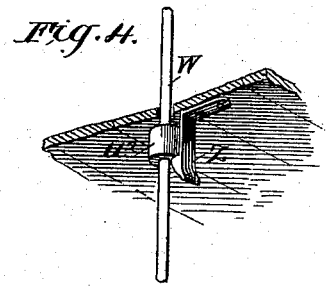
Figure 3:
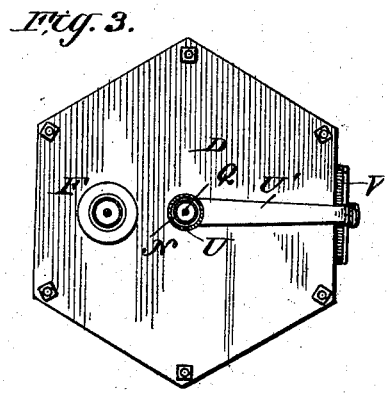
Figure 2:
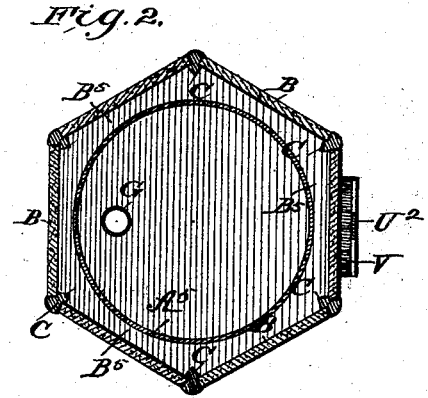

Figure 1 is a vertical section of our improved filtering devices illustrating the same arranged in a cistern or well for use. Fig. 2 is a horizontal section of the same on the line 2—2 Fig. 1. Fig. 3 is a similar view thereof on the line 3—3 Fig. 1. Fig. 4 is a detail view of the brush holding spring clamp hereinafter referred to.

Referring to the accompanying drawings by letters, A indicates the main or filtering cylinder, which in its practical construction is preferably eighteen inches in diameter, and three feet long and is adapted to seat in the bottom of the well or cistern, or be supported therein, in a submerged position. This cylinder which in practice is hexagonal in horizontal section, has its side walls formed of a series of jointed filtering bricks B formed of a porous material best adapted for filtration purposes. These bricks B, are held in place by the vertical angle or corner pieces C formed of metal which are joined at the top and bottom with the upper and lower head plates D and E respectively.

It should be stated that our improved filtering devices are adapted to be used in connection with any of the ordinary pumping devices which are connected with the outlet of the cylinder. In the drawings we have shown the pump F connected with the outlet tube G of the cylinder, which extends down into it, and through the lower cross head where it has a flange $g$ projected under the openings $e$ through which the tube passes, it being held closed thereagainst by the clamp nut H; such tube also having an inlet $g'$ near its lower end as shown.

The upper end of the tube F passes through the upper head D, and has fitted therein a flanged cap or washer plate I, which serves to close the opening $d$, and which is held down against the head by the lower end of the pump cylinder J which screws onto the threaded upper end of the tube G.

It will be noticed by reference to Fig. 1, the tube G is disposed at one side of the cylinder, away from the center, the pump projecting up through the well top, it being however provided with a jet or small discharge nozzle K at a point under the platform L for a purpose presently explained.

M indicates a valve chamber, projected centrally up from the cylinder A which communicates therewith through the aperture $m$, and from such chamber M, extends a pipe N, which connects with a tank O, disposed preferably under the platform and held to receive the drippings from the pump discharge nozzle K.

P indicates a vent pipe which connects with pipe N at a point directly under the tank O, and extends up to the top of such tank as shown, and within the said pipe N is held for vertical reciprocation, a valve rod Q, which has at its lower end a float valve R, and at its upper end a valve plate S. These valves it will be noticed are so disposed relatively that when the cistern A is but partly filled as shown in Fig. 1 the upper one will serve to hold the discharge outlet in the tank O closed, while the lower one will be just above the opening m thereby leaving a free escape for the air in the cylinder through the opening M, pipe N and vent pipe P.

U indicates a sleeve mounted on the lower end of pipe N, and held to slide vertically thereon, which sleeve has a horizontally projecting arm U', which is bent down into a vertical member $U^2$, the lower end of which carries a brush V, which is held to engage the outer face of the cylinder.

The upper end of the sleeve U has a short angle member $u$ to which is connected a short pipe section $u'$, to the upper end of which is fitted a union or joint piece $u^2$, into which is adapted to be detachably fitted an operating rod W, which projects up through the platform and has a hand hold as shown. Normally the scraper arm $U^2$ is held to its uppermost position, and for this purpose a spring catch Z is secured to the under side of the platform, with which the lower edge of the joint $u^2$ is adapted to engage (see Fig. 4) and when in this position the hand or operating rod W is unscrewed and removed.

By providing a brush carrying device arranged as shown it will be readily seen that when it becomes necessary to clean the outer faces of the filtering brick, the rod W can be quickly screwed into the piece $u^2$, and by applying slight pressure downward such piece will be released from the detent or spring catch, and as the member $U^2$ is made of metal bent to have a slight spring pressure inward, the operator, by moving the rod W, vertically, will cause the brush to pass over the brick, and owing to the sleeve connection before referred to the operator can easily rotate the member $U^2$ (the platform having an opening to accommodate the rod W) it having enough spring to pass over the angle corners of the cylinder A.

In filtering means of this kind the filtering cylinder frequently fills faster than the water is withdrawn therefrom, and as the water pressure within and without the cylinder thus becomes equalized the pores become clogged by sediment. By arranging the back pressure means as before described we have provided for automatically creating a circulation of the water through the filtering blocks, in that as soon as the water rises to a point to enter the chamber M, it will operate to raise the float valve, which in turn opens the supplemental tank and allows the water therein to flow down into the chamber M, and as the pressure on the water within the cylinder, becomes, through the fall or gravity force of the water from the supplementary tank, greater than the pressure in the cistern it follows that the water in the cylinder will be forced back through the filtering blocks and thereby serve to clean out the pores, it being obvious that so soon as water is again pumped from the cylinder, and the water body falls to a point below chamber M the air vent is again opened and the tank O closed off from pipe N.

Within the filtering chamber A is disposed a sheet metal cylinder $A^5$ of a slightly less diameter than the interior of such chamber, and which is secured at its lower end to the bottom of the chamber A, while its upper end extends nearly to the top of such chamber, as clearly shown in Fig. 1.

The object in providing the internal cylinder is to prevent the water as it is drawn out of the chamber A by the pumping action, from washing the inner face of the filtering walls.

Having thus described our invention, what we claim as new, and desire to secure by Letters Patent, is—

1. As an improvement in cistern filters, a filtering chamber having porous sides, pump devices connected therewith a supplemental tank held above the said chamber, a pipe connection between such tank and the chamber, valve mechanism held in such connections, arranged to normally close off such tank from the chamber, and adapted to be moved to an open position by the water in the said chamber as it rises above a predetermined point, all substantially as set forth.

2. As an improvement in cistern filters, the combination with a filtering chamber having porous sides, and the pump mechanism including the drip nozzle or pipe, of a supplemental tank held above the chamber to receive the water from such nozzle, a pipe connection between such tank and the filtering chamber, a float valve device held therein to normally close off such tank from the said chamber, and adapted to be raised by the water in the filtering chamber when it rises up into such pipe connection, all substantially as shown and for the purposes described.

3. As an improvement in cistern filters, the combination with the filtering chamber, having non-filtering upper and lower head portions, and having a supplemental chamber at the top, and a float valve disposed therein but held from closing off such supplemental chamber from the main chamber, of a tank held above the filtering chamber, having an outlet a pipe connection between such tank outlet and the float valve chamber, a valve held to normally close the outlet, connected with the float valve, said pipe having an air or vent lateral, and pumping devices connected with the filtering chamber all arranged substantially as shown and described.

4. As an improvement in cistern filters, a filtering chamber formed of non-filtering top and bottom head portions, vertical angle members connecting such heads, filtering blocks held between such angle members, and a pump tube projected below and above the heads, having clamping means, fitted against such heads all arranged substantially as shown and described.

5. In a cistern filtering means, the combination with a filtering chamber having porous sides, and a vertical central guide, of a vertically movable brush or cleaner member having a sleeve movable on the said guide, and a vertical member having a union member, an operating rod or handle member adapted to be detachably connected with such union member, and a spring catch or detent adapted to engage the said union member to hold the cleaner to its uppermost position all arranged substantially as shown and for the purposes described.

6. An improved filter for cisterns, or wells, comprising a chamber or body having sides formed of a filtering material, pump devices connected with the top at one side of the center, and having an escape or drip nozzle, said chamber having a centrally projected overflow chamber, a float valve held thereon, a pipe projected up from such overflow chamber, a tank connected to the upper end thereof, a valve held therein to normally close such tank from the pipe, and connected with the float valve, said tank held to receive the water from the drip nozzle, a sleeve held to rotate in the central pipe section having at its lower end an arm having a pendent brush carrying member, held to be operated on the outer face of the filtering chamber, and an operating rod or handle connected with the sleeve for reciprocating it all arranged as shown and for the purposes described.

JOSEPH G. SUTTON.
SMITH A. SUTTON.

Witnesses:
H. A. OBLEY,
B. GETCHEY.